Aug. 22, 1939.  J. U. ECHEVARRIA  2,170,471

GREASE BOX FOR ROLLING STOCK FOR RAILWAYS AND TRAMWAYS

Filed July 15, 1936

Jose Urrutia Echevarria
Inventor
By Glascock Downing & Seebold
Attys.

Patented Aug. 22, 1939

2,170,471

UNITED STATES PATENT OFFICE 2,170,471

GREASE BOX FOR ROLLING STOCK FOR RAILWAYS AND TRAMWAYS

José Urrutia Echevarria, Madrid, Spain

Application July 15, 1936, Serial No. 90,773
In Spain July 23, 1935

1 Claim. (Cl. 308—91)

The present invention relates to a novel grease box for railways, metropolitan railways and tramways, which is distinguished by the mode of effecting the lubrication and by the arrangement and condition of the elements composing the grease box.

One embodiment of the invention is illustrated in the accompanying drawing, in which.

Figure 2:
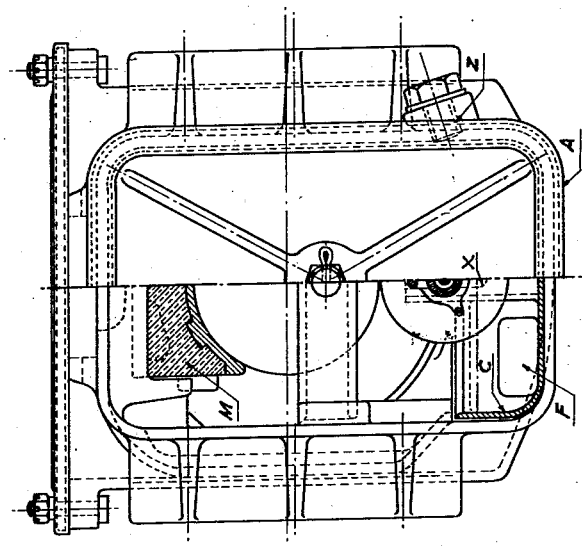
Figure 2 is a side view of the grease box, one half of this figure showing the cover removed and the other half showing the cover in place.
Figure 1:
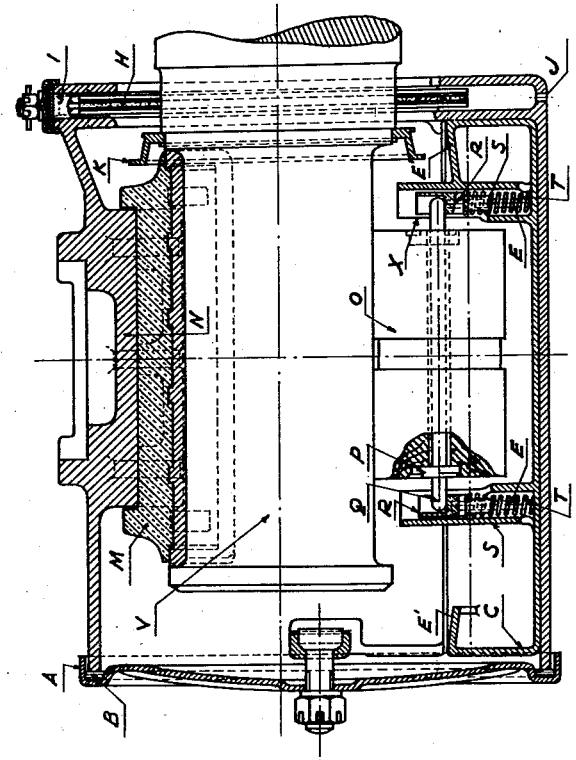
Figure 1 is a longitudinal section of the grease box.

As will be seen in the drawing, the lubrication of the axle is effected by friction, whereby a perfect and constant lubrication is obtained and a great economy of grease is effected.

In the figures the grease box is formed of a body made in a single piece and closed at its front part by means of the cover A and the packing B.

The rear part of the grease box is provided with an aperture and in the middle of the rear wall of the grease box comprising this aperture is formed a groove I adapted to receive the dust excluder H. Immediately beyond the groove I towards the left, the body of the grease box is enlarged to form a chamber having inclined walls in which the centrifugal obturator K can move freely.

In continuation of this chamber and projecting from the inner wall at the upper part is situated the seat N of the grease box which bears upon the bush M, which in its turn is mounted upon the axle V.

At the lower part of the grease box is situated a reservoir C divided into three compartments communicating with each other through the orifices F which are formed in the dividing walls E. These dividing walls adopt at their centre the form of hollow cylinders S in the interior of which are situated the helical springs T, carrying the bearings R which support the spindle Q upon which the roller O is mounted by means of ball bearings P, so that it can turn freely on this spindle, the roller having freedom of movement in a vertical direction in guides formed by the grooves X provided in the opposite walls of the cylinders S.

In front of the counter-axle Y is keyed the centrifugal obturator K.

A screw-threaded filling hole Z is situated in the side of the grease box and is closed with a nut.

The object of the aperture in the rear part of the grease box is to permit the grease box to be placed upon the axle and also to permit the bush M to be mounted and removed when necessary from the front part of the grease box, without it being necessary to raise the vehicle completely, since it is sufficient to raise the latter and the grease box a few millimetres in order to permit the above mentioned operation to be performed.

The dust excluder H is intended to protect the interior of the grease box from the action of external agents such as dust, stones, straw and water, the latter flowing out from the lower part of the groove I and being evacuated through the orifice J.

The centrifugal obturator K serves, as its name indicates, for returning the oil to the reservoir C by means of centrifugal force, since any oil expelled by the bush and sliding along the axle which seeks to issue to the exterior is collected by the obturator and projected upon the walls of the chamber, the inclination of which walls leads the said oil back to the reservoir.

As in the greasing system according to the invention the lubricant is barely agitated, no oil mist is produced and consequently the efficiency of the above mentioned obturator is unimpaired.

This assists in lengthening the life of the dust excluder which remains constantly dry and it also assists in obtaining a considerable economy in lubricant and manual labour, since the intervals between the lubricating and inspection periods may be considerably lengthened.

The bush possesses a feature that the circular arc dividing the bronze and anti-friction metal parts has a radius which is two millimetres greater than that of the axle, while its centre is displaced six millimetres upwards in a vertical direction, relative to the centre of the axle, so that if by an unforseen accident the anti-friction metal melts, the bronze bush will automatically become situated upon the axle with a sufficient bearing surface and with the necessary opening to secure sufficient lubrication, so that the vehicle can thus be used without any injury to the axle.

The oil reservoir C is situated at the base of the grease box and is introduced therein through the front part of the latter. Once placed in position, the reservoir is prevented from moving in a transverse longitudinal direction by the walls and the cover of the grease box and it is prevented from moving in a vertical direction by projections on the walls of the grease box and by the base of the grease box, so that the roller is always situated in the most favourable position for its good operation.

This reservoir is divided into three compartments by means of the vertical dividing walls E, and the compartments are closed at their ends by inclined flanges E'. The three compartments communicate with each other through orifices F formed in the lower part of the dividing walls so that the oil level is the same in all the compartments.

The construction of the reservoir also steadies the oil effectively and prevents it from being thrown out upon inclines or as a consequence of violent impacts when manoeuvring.

The greasing apparatus consists of a roller O provided at its centre with a circular groove. At the two ends of this roller are fixed the outer rings of two ball bearings P.

The dividing walls E of the reservoir C have at their centre the form of hollow cylinders S, in the opposed walls of which are provided vertical grooves X. In the interior of these cylinders are lodged low compression spiral springs T, having an ample movement. These springs in their turn support two bronze bearings R, suitably shaped to reduce in part the friction of the spindle Q which is adapted to turn upon them; the ends of each spindle are of hemispherical shape. Upon this spindle at a suitable distance apart are situated two ball bearings P, the outer ring of which is secured to the roller Q as stated above.

By this means the roller is given a two-fold movement of rotation, and it can effect its various movements separately or simultaneously by means of the spindle Q and the ball bearings P, thus ensuring that the said roller will never remain inoperative when the vehicle is in motion.

The operation of the apparatus described above is very simple. As soon as the vehicle commences to move the roller O which is held in permanent contact with the axle by means of the springs T is rotated by friction in the opposite direction to the latter, thus lifting a quantity of oil from the reservoir C in which the roller is partly immersed, so that the axle is lubricated with this oil.

This rapidity with which the lubrication is effected considerably assists in starting. The quantity of lubricant raised is proportional to the speed of the train.

This abundant quantity of oil which is brought into contact with the axle assists in preventing the temperature of the bearing from rising more than 8° above the ambient temperature during running, and enables the system according to the present invention to give optimum results, equally in vehicles running at high, medium and low speeds.

Having now described my invention, what I claim as new and desire to secure by Letters Patent is:

In a grease-box for the lubrication of the axles of railways, metropolitan and tramway rolling stock and for like purposes, comprising a box, an axle journal in the box, and a seal between the axle and the inner wall of the box, the combination of a roller lubricating means comprising an oil reservoir positioned in the bottom of the box and divided by apertured walls into three compartments which communicate with each other through said apertures to maintain at the same level the oil in each of the said compartments, hollow cylinders formed in said apertured walls, spiral springs within said cylinders, seatings on said springs, a spindle supported at its ends upon said seatings, ball bearings secured to the ends of said spindle, a roller mounted upon said ball bearings so as to have a two-fold movement of rotation separately or simultaneously, the said roller being partly immersed in the oil in the reservoir and having a smooth surface which is shorter than the axle journal and makes frictional contact with said axle journal whereby the said roller is rotated and the axle is lubricated by oil taken up from the central portion of the reservoir, and an annular groove at the centre part of the roller for returning the oil to the reservoir.

JOSÉ URRUTIA ECHEVARRIA.